United States Patent [19]
Grise et al.

[11] 3,854,770
[45] Dec. 17, 1974

[54] TRUCK COVER

[75] Inventors: Frederick G. J. Grise, East Falmouth; Walter Lovell, North Wilbraham, both of Mass.

[73] Assignee: Pioneer Coveralls, Inc., North Oxford, Mass.

[22] Filed: Nov. 20, 1972

[21] Appl. No.: 308,255

[52] U.S. Cl. .................................. 296/98, 296/100
[51] Int. Cl. ............................................... B60p 7/02
[58] Field of Search ........... 296/100, 98; 242/86, 52

[56] References Cited
UNITED STATES PATENTS
| | | | |
|---|---|---|---|
| 3,515,428 | 6/1970 | Killion | 296/100 |
| 3,549,197 | 12/1970 | Sibley | 296/100 |
| 3,549,199 | 12/1970 | Sibley | 296/100 |

*Primary Examiner*—Robert R. Song
*Attorney, Agent, or Firm*—Charles R. Fay

[57] ABSTRACT

An installation for a truck cover comprising a bow pivotally mounted on an axis on the sides of a truck body, said bow extending from the axis thereof to a position adjacent the front end of the body where there is mounted a rotary shaft with a cover rolled on it, the cross piece of the bow being attached to the leading end thereof; said bow including legs extending to the opposite side of the pivot axis for a short distance with cables attached to extreme end portions thereof and wound on the shaft so that when the shaft is rotated in one direction the cover is mechanically extended to completely cover the truck body and when the shaft is rotated in the opposite direction the cover is wound on the shaft.

10 Claims, 3 Drawing Figures

PATENTED DEC 17 1974

3,854,770

TRUCK COVER

BACKGROUND OF THE INVENTION

There have been patents issued for commercially successful truck covers including U.S. Pat. No. 3,549,198 and 3,549,199 among others.

There are laws requiring that open bodied trucks must be covered generally for the purpose of safety to prevent discrete material in the truck body from flying off, and this is particularly apt to happen in respect to sand and gravel, trap rock, rubbish, etc.

A prime consideration is to provide a positively actuated cover which may be extended mechanically as well as retracted mechanically from a retracted position wound on a shaft to a completely extended position covering the material in the truck body. Until the present invention the most successful manner of extending the cover was to use power such as springs or the like constantly urging a bow attached to a rolled up cover in a direction to cover the material in the truck, and to provide a separate means working against the springs, etc., to re-roll the cover and expose the truck body. It is the general purpose of the present invention to provide a relatively simple device which is positively actuated in both directions by the same means, whether manually or by power, thereby providing a less expensive, easily operable, and efficient cover.

SUMMARY OF THE INVENTION

An open truck body having side walls is provided with a U-shaped bow having spaced parallel side arms pivoted intermediate the ends thereof on the truck body side walls, so that the closed portion of the bow can be swung from end to end of the body. The bow is secured to the leading end of a roll of a length of material which forms the actual cover, normally rolled on a rotary shaft at one end of the truck body. The bow side arms have end portions extending oppositely of the pivot axis from the closed end of the bow and these end portions are connected to cables. The cables extend toward the shaft holding the roll of cover material and are wound thereon, so that when the shaft is rotated either manually or by power the end portions of the side arms are pulled in one direction to extend the cover over the truck body, and when it is desired to uncover the truck body it is merely necessary to rotate the shaft in the opposite direction thereby rolling up the cover on the shaft. Means is provided for holding the cover in its rolled up position so that extra catches and clamps for this purpose are not necessary.

Rising and falling cable pulleys are used on the shaft because of the fact that the initial and final portions of the motion of the bow vary from the motion at the midpoint of the bow where the same is at its highest location over the center of the load in the truck body.

PREFERRED EMBODIMENT OF THE INVENTION

Figure 1:
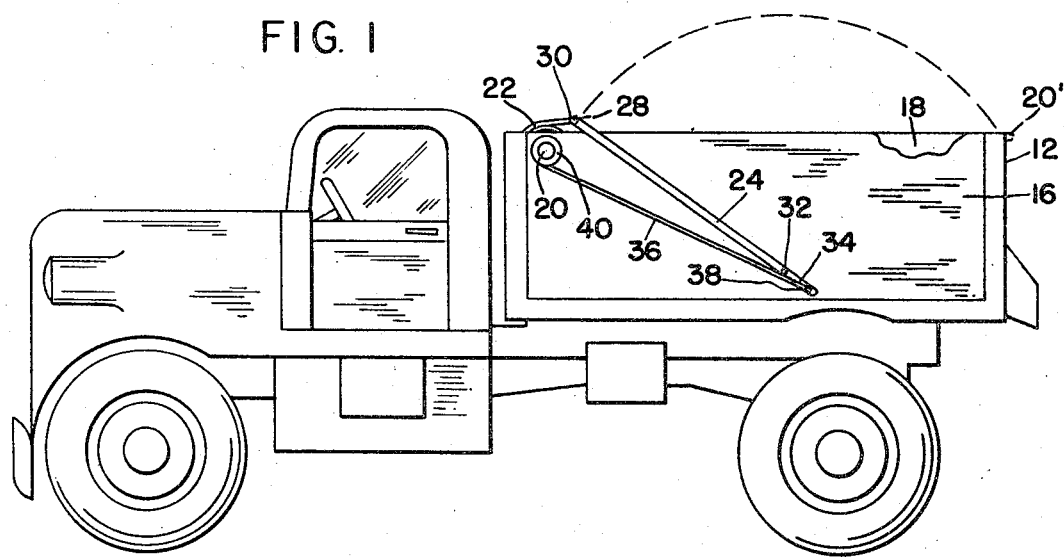
FIG. 1 is a view in elevation showing the cover in retracted position in full lines and a path of the covering action in dotted lines.
Figure 2:
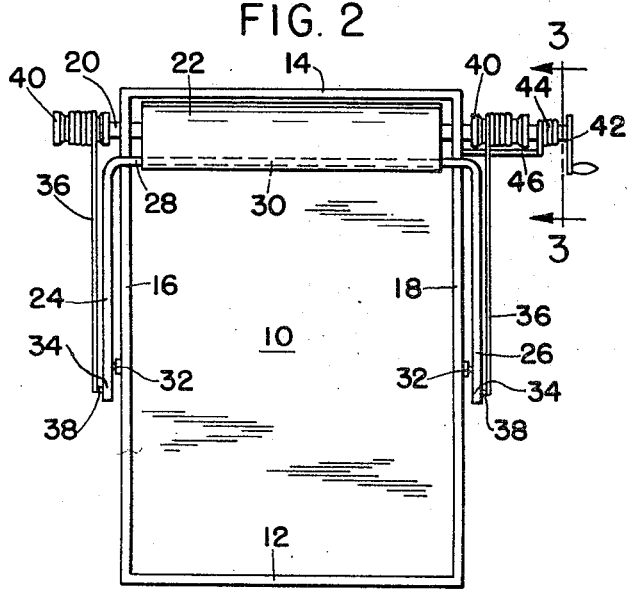
FIG. 2 is a partial top plan view showing the cover in retracted position.

The outline of an open body truck is shown in FIG. 1. The truck body has the usual bottom 10, ends as at 12, 14 and side walls as at 16, 18. A shaft 20 is rotatably mounted relative to the side walls 16, 18, and extends across the same. This shaft may be mounted on the cab or headboard as shown in the art identified but it must be located adjacent one end of the truck body or the other. The shaft has a length of flexible cover material wound on it, as at 22.

A bow comprising spaced parallel side members 24, 26, and a cross member 28 connected to the leading end 30 of the cover, is pivotally mounted by any desired or convenient means on the side walls 16 and 18 intermediate the ends of the body as on a transverse axis at 32. The side members extend past the pivot for a short distance as at 34. A cable 36 is connected at one end to each extension 34 at 38 and has its opposite end wound on a pulley 40. Pulleys 40 are of the rising and falling type and may be grooved to accommodate the cables.

A crank handle 42 is attached to the shaft 20 to rotate it, or any means can be used for this purpose e.g., an electric motor. Upon turning the shaft in one direction the cables are tightened and turn side members 24 clockwise in FIG. 1, extending the cover 22 since the latter is attached to the bow cross member 28, a fixed part of the bow. This rotation is continued until the leading end of the cover reaches the rear wall 12 of the truck body and can pass it as shown at 20' if desired.

Figure 3:
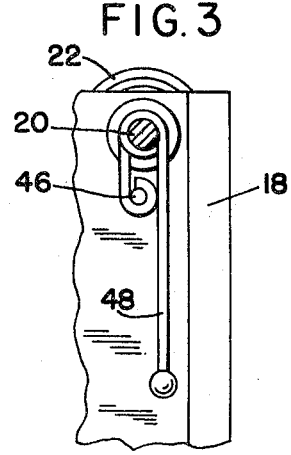
FIG. 3 is a section on line 3—3 of FIG. 2 on an enlarged scale.

Rotation of the shaft in the opposite direction winds the cover 22 on the shaft and this causes the bow to swing back to original position. A spring type one-way clutch may be used to brake the shaft and to keep it where it is desired, either in cover extended or cover retracted position. This clutch comprises a coil spring 44 having a fixed end 46 and a free end 48. The spring is coiled and tensioned to normally grip the shaft and resists rotation thereof, but if the free end 48 be moved, e.g., manually, to the right, anti-clockwise, FIG. 3, the coils of the spring open up are loosened from the shaft and the grip on the shaft is thus relaxed, allowing rotation of the shaft in either direction as required.

We claim:

1. The combination with a container having a bottom, side and end walls and an open top, and a cover therefor, a rotary shaft extending transversely of said container adjacent an end thereof, the cover being rolled about said shaft and having leading end, means to turn the shaft in both directions, a bow, said bow including a pair of side members, means pivoting the side members on an axis intermediate the ends thereof to the side walls of the container, said bow including a cross member parallel to the shaft, the leading end of the cover on the shaft being connected to said cross member, a cable having an end connected to wrap on said shaft, at least one of said bow side members including an extension beyond the pivot axis, the pivot axis being intermediate the ends of the arm of the bow, the other end of the cable being connected to the extending end of said bow side member, rotation of the shaft in one direction tensioning the cable and pivoting the bow in one direction extending the cover over the truck body, rotation of said shaft in the opposite direction drawing the bow back and wrapping the cover onto the shaft.

2. The combination of claim 1 including a one-way clutch brake for said shaft holding the same in selected position, and means for releasing the one-way clutch brake so as to allow rotation of the shaft in either direction.

3. The combination of claim 2 wherein said one-way clutch brake comprises a coiled spring about the shaft generally coaxial therewith, and means fixedly locating one end of said spring.

4. The combination of claim 3 including a handle member at the opposite end of the spring, said handle member being free and being movable in a direction to release the coils of the spring from said shaft.

5. The combination of claim 1 including a second cable secured between the shaft and the other bow side member extension.

6. The combination of claim 1 including a rising-falling pulley on the shaft, the cable being trained thereon.

7. A truck cover for an open truck body having a side wall comprising a shaft adjacent one end of the truck body, means to rotate the shaft in either direction, a flexible free-ended elongated cover member on the shaft, rotation of the shaft in one direction winding the flexible cover member onto the shaft, a cable wound on the shaft in a direction to wind the cable on the shaft upon rotation of the shaft in a direction opposite to the direction of rotation of the shaft in winding up the flexible cover member, a lever pivoted to the wall of the truck body at a point removed from the shaft, the fulcrum of said lever being intermediate the ends thereof, one end of the lever being secured to the free end of the flexible cover member and the other end of the lever being secured to the opposite end of the cable from the shaft, rotation of the shaft to wind up the cable causing the lever to move to unwind the flexible cover member and carry it over the truck body, and rotation of the shaft to wind up the flexible cover member uncovering the truck body.

8. The truck cover of claim 7 including a second lever and cable, the levers and cables being located at opposite sides of the truck body.

9. The truck cover of claim 8 including a connection between the levers, the free end of the flexible cover member being secured to said connection, the levers being operated in unison and the connection and free end of the flexible cover member first rising and then falling relative to the truck body in the motion of the levers in both directions.

10. The truck cover of claim 7 including means to frictionally lock the shaft, and means to release said locking means.

* * * * *